Nov. 14, 1939.    O. KOVALOVSKY ET AL    2,180,321
FISHING REEL
Filed Feb. 9, 1937    3 Sheets-Sheet 1
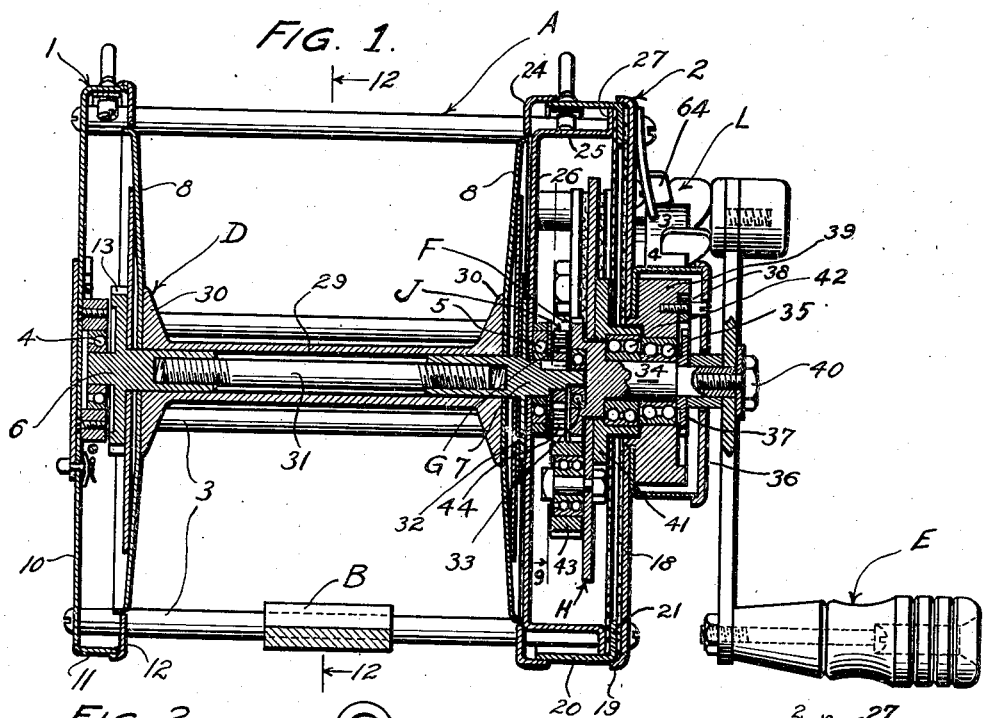
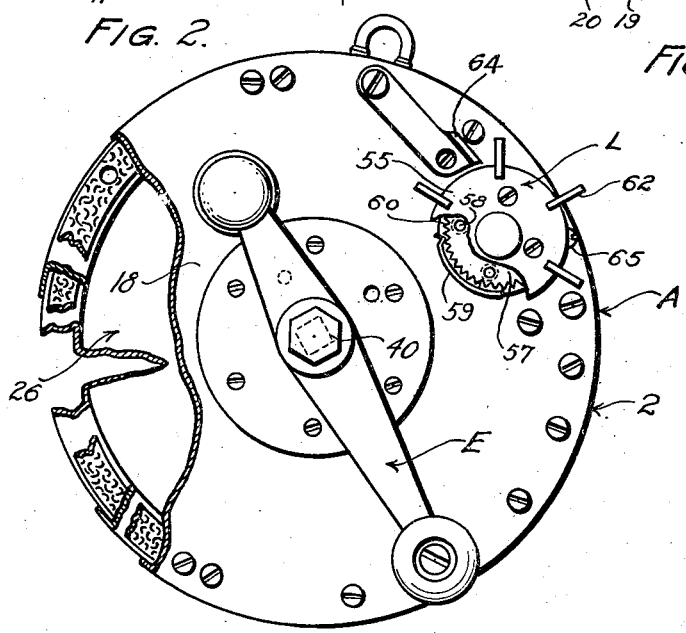
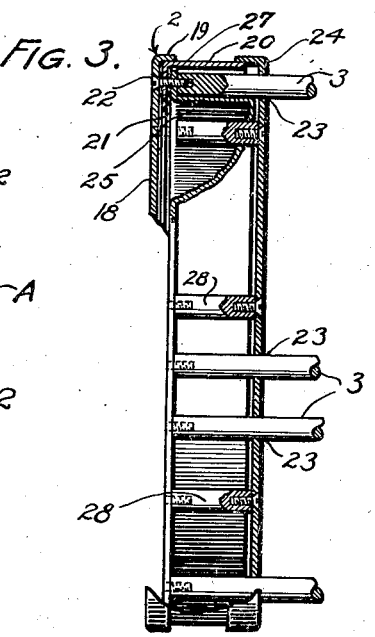
INVENTOR.
Oscar Kovalovsky and Arthur Kovalovsky
BY
ATTORNEY.

Nov. 14, 1939. O. KOVALOVSKY ET AL 2,180,321
FISHING REEL
Filed Feb. 9, 1937  3 Sheets-Sheet 2
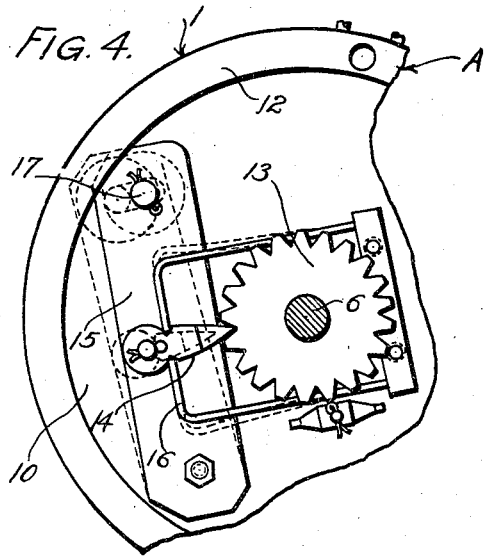
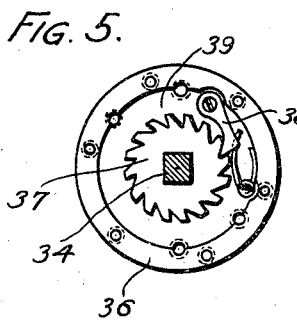
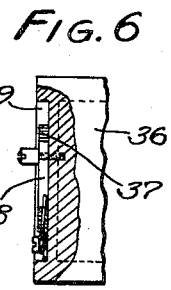
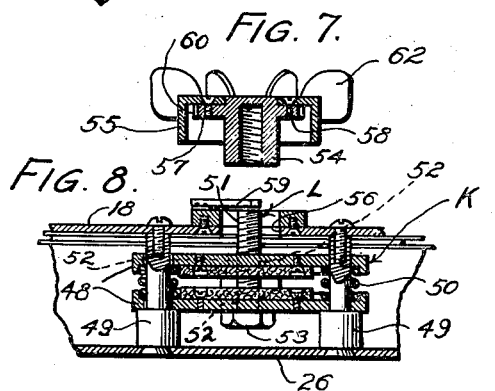
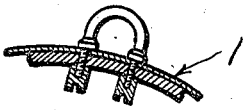
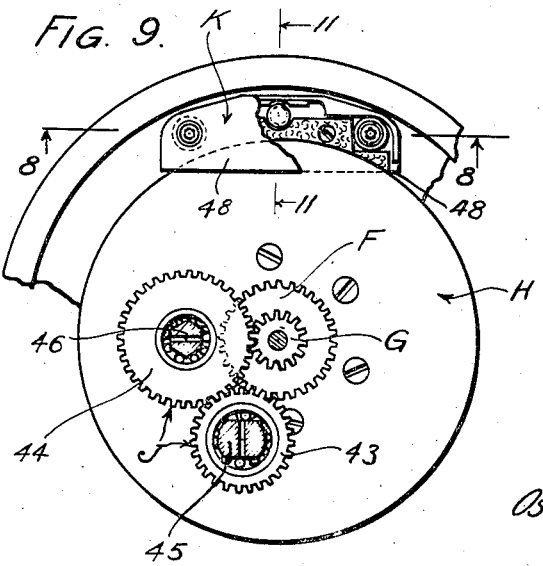
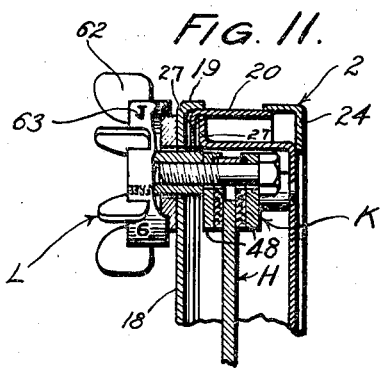
INVENTOR.
Oscar Kovalovsky and Arthur Kovalovsky
BY
ATTORNEY.

Nov. 14, 1939.   O. KOVALOVSKY ET AL   2,180,321
FISHING REEL
Filed Feb. 9, 1937   3 Sheets-Sheet 3
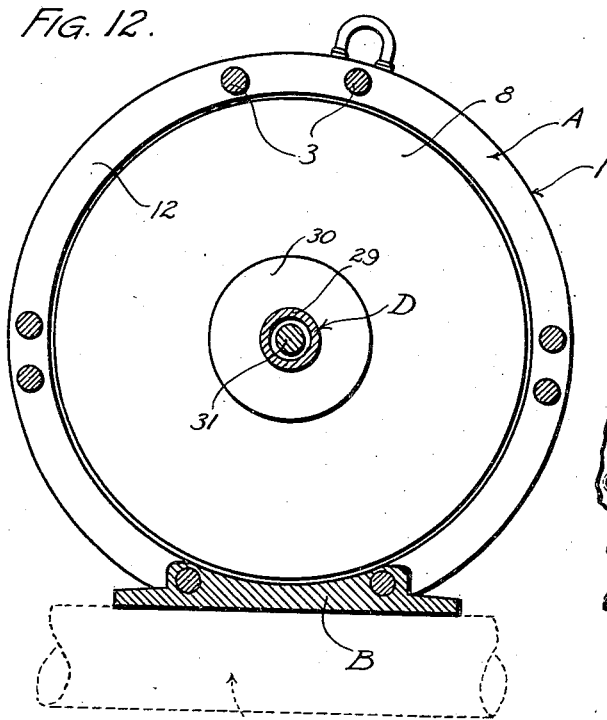
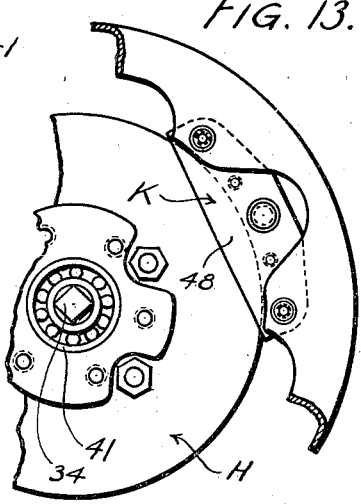
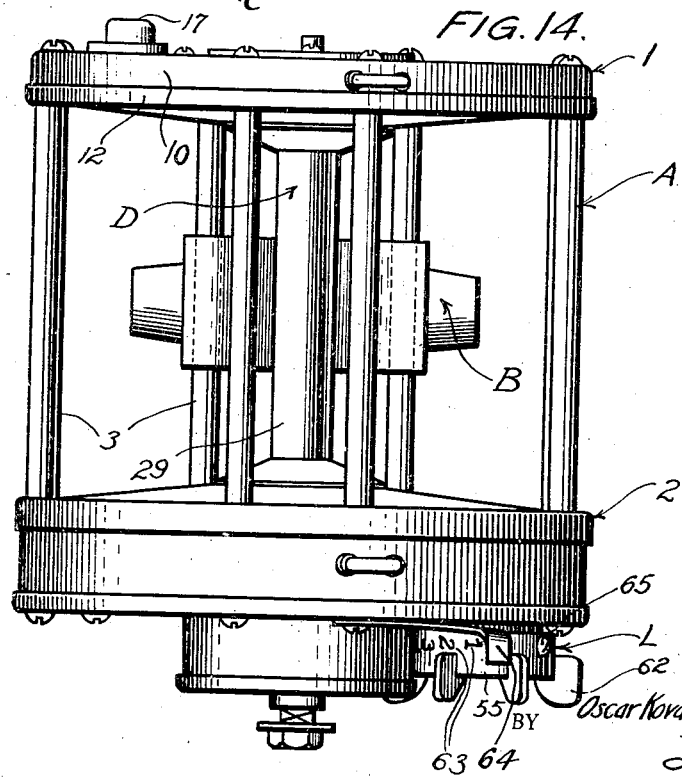
INVENTOR.
Oscar Kovalovsky and Arthur Kovalovsky
ATTORNEY.

Patented Nov. 14, 1939

2,180,321

UNITED STATES PATENT OFFICE 2,180,321

FISHING REEL

Oscar Kovalovsky and Arthur Kovalovsky,
Los Angeles, Calif.

Application February 9, 1937, Serial No. 124,824

3 Claims. (Cl. 242—84.5)

This invention relates to and has for an object the provision of a fishing reel, which is specially constructed to facilitate the landing of big game fish such as sword fish, tuna, sharks, etc., weighing hundreds of pounds.

More particularly, the present invention relates to certain specific improvements in fishing reels of the type forming the subject matter of United States Letters Patent for Fishing reels under dates of May 15, 1934, and November 26, 1935, and respectively bearing Patent Numbers 1,958,919 and 2,022,204.

One of the objects of the invention is to provide a reel of the character described, having a novel and efficient planetary gear drive between the handle and spool, to insure an easier and more effective operation of the reel and prevent the transmission of the unwinding movement of the spool to the handle, said planetary gear drive readily lending itself to cooperation with and to control by a novel frictional drag means.

Another object of this invention is to provide a novel frictional drag means which is enclosed in the reel frame and controlled by a single adjusting means operable at will on a stationary part of the frame to selectively permit a free unwinding movement of the spool with or without a frictional drag thereon, and to render the gearing operative to effect a "reeling in" rotation of the spool upon appropriate turning of the handle.

A further object of this invention is to provide a fishing reel of the character described, wherein the planetary gearing together with the drag and its adjusting means are enclosed within the reel frame instead of being mounted on the handle, whereby to eliminate a bulky handle structure and to render the reel stronger, more durable and subject to easier operation with easier access to the drag adjusting means at all times, regardless of the position of the handle.

An additional object is to provide a frictional drag means which will afford a nicety of drag control over a wide range, from a condition in which a free spool is provided to a condition of locking the handle and spool for a reeling in operation of the latter, while preventing the transmission of the unwinding movement of the spool to the handle at all times.

Other objects and advantages will appear hereinafter and, while we have shown and will describe the preferred form of our invention, it will be understood that we do not limit ourselves to such preferred form but that various changes and adaptations may be made therein without departing from the spirit of our invention, as defined in the claims appended hereto.

Referring to the drawings:

Fig. 1 is a vertical section of a reel constructed in accordance with our invention, Fig. 2 is an end view of said reel with portions broken away, Fig. 3 is a fragmentary plan view of an end of the reel frame, with parts broken away and parts in section, Fig. 4 is a fragmentary end view with the outer plate removed to shown "click" mechanism, Fig. 5 is a front view of the handle ratchet for limiting the movement of the handle to one direction, Fig. 6 is a fragmentary side elevation of the mechanism shown in Fig. 5, Fig. 7 is a sectional view of the drag adjusting wheel, Fig. 8 is a sectional view of the drag means taken on the plane of line 8—8 of Fig. 9, Fig. 9 is a sectional view taken on the plane of line 9—9 of Fig. 1, Fig. 10 is a fragmentary sectional view of the part of a frame showing the harness attaching loop in side elevation, Fig. 11 is a vertical section taken on the plane of line 11—11 of Fig. 9, Fig. 12 is a sectional view taken on the plane of line 12—12, Fig. 1, Fig. 13 is a fragmentary end view showing the friction disc and brake shoes comprising the drag means in elevation, Fig. 14 is a top plan view of the complete reel with the handle omitted.

One form of the reel of this invention generally comprises, as shown in the accompanying drawings, a frame A, means B for attaching the frame to a fishing rod C as indicated in Fig. 12, a spool D rotatable on the frame and an operating handle or crank E rotatable on said frame. The reel also includes frame enclosed driving and driven gears F and G respectively fixed to and rotating with the handle and spool, a disc H rotatably enclosed in the gear enclosing space of the frame, a train of planetary gears J supported by said disc and providing a driving connection between said driving and driven gears, frictional drag means K adapted to frictionally engage with said disc, and single rotary drag adjusting member L fixed on said frame. This member L is operable at will to provide a free spool or to vary the drag as desired, and to lock the spool and handle for a reeling in operation.

The frame A is comprised of circular end members 1 and 2, formed as casings and joined by tie rods 3. Within these end members are frictionless bearings 4 and 5 for the trunnions 6 and 7 of the spool D. The flanges 8 of the spool rotate in openings formed in the opposed faces of said end members.

The end member 1 is comprised of an outer plate 10 having an inturned peripheral flange 11 to which is soldered an annular member 12, within which one flange of the spool is freely rotatable. The member 12 and spool flange 8 therein form the inner side of the casing provided by the end member one. Within this end member is a click mechanism comprising a toothed wheel 13 fixed to the trunnion 6, a pawl 14 mounted on a pivoted plate 15, a spring means 16 for said pawl, and an operating button 17 movable on the outer face of the plate 10 to bring said pawl into and out of "clicking" position as desired.

The end member 2 comprises an outer plate 18 having an inturned peripheral flange 19 to which is secured an annular member 20 having a flange 21 opposed to the inner side of the plate proper. Screws 22 extend through the plate 18 and flange 21 and secure the tie rods in place. These rods extend through openings 23 in an annular member 24, corresponding to the member 12 and having the spool flange disposed therein. It will be noted that the rods 3 lie upon the outer side of the annular wall 25 of a gear casing member 26, which latter is closed by the outer plate 18. This annular wall 25 has a flange 27 opposed to the flange 21 and against which, ends of the rods 3 abut, as shown in Fig. 3. The annular member 24 is held spaced from the flange 27 by means of spacers 28 removably secured in place as particularly shown in Fig. 3. Suitable gaskets are employed to make the gear enclosing casing leak proof and suitable for containing a liquid lubricant whereby the gear connection between the handle and spool and the drag means may be operated in said lubricant.

It will thus be seen that the frame A which includes the end members 1 and 2, is strong and durable, while being light as to weight, and of compact construction, subject to readily assembling and disassembling.

As here shown, the spool D includes a tubular hub member 29 having end flanges 30 soldered or otherwise secured to the inner faces of the spool flanges 8. The flanges 8, it will be noted, may be laminated as here shown, to provide strength without materially increasing the weight thereof. The trunnions 6 and 7 extend through openings in the flanges 8 into the ends of the tubular hub 29, and have internally screw threaded inner ends in which the ends of a tie rod 31 are threadedly engaged to hold the spool assembled. The lamination of the flanges 8 are held in place by the toothed wheel 13 on the trunnion 6 and a flange 32 on the trunnion 7. This structure provides for a light, yet strong and well balanced spool which may be readily assembled and disassembled.

It will be seen that the trunnion 7 extends into the gear casing and has the driven gear G keyed thereon. The outer end of this trunnion is journaled in a frictionless bearing 33 countersunk in the driving gear F. The gear F, it will be noted, is fixed on one end of a shaft 34, journaled in a bearing 35 within a small casing 36, which latter is fixed to the outer side of the plate 18. A ratchet wheel 37 is mounted on the shaft 34 within the casing 36 and cooperates with a pawl 38 fixed on a stationary member 39, whereby to limit the shaft 34 to clockwise rotation only. On its outer end the shaft 34 has the handle E affixed thereto as by the fastening means 40.

The disc H is circular and fixed to a hub member 41 arranged to rotate around the shaft 34 on a frictionless bearing 42, which latter also serves as a bearing for said shaft. It is thus seen that the gears F and G, disk H and shaft 34 are coaxial.

The planetary gear train J comprises meshing gears 43 and 44 rotatable on suitable bearings carried by studs 45 and 46, which are fixed to one side of the axis of and on the disc H. The thicker gear 43 meshes with the driving gear F and also the gear 44 whereas the gear 44 meshes with the driven gear G as particularly shown in Figs. 1 and 9. A driving connection is thus provided between the handle and spool whereby when the disc H is held against rotation by the drag means K and the handle is rotated in a clockwise direction, the gears F, 43, 44 and G are rotated about their own axes only and provide for a winding or reeling in action of the spool. However, upon release of the disc H by the drag means K, whereby said disc is free to rotate, the gears 43 and 44 will be given a planetary movement when the spool unwinds, without transmitting any movement to the handle.

The drag means K comprises a pair of flat and suitably lined brake shoes 48 arranged to engage opposite sides of the disc H near the periphery of the latter, said shoes being mounted on posts 49 and normally held apart and free from frictional contact of said disc by means of springs 50.

The drag adjusting means L comprises a screw threaded member 51, extended freely through openings 52 in the shoes 48 and having its head 53 engaged with the outer face of one of said shoes. The threaded portion of said member 51 is screwed into an internally threaded nut 54 fixed on the adjusting wheel 55. The nut 54 extends through an opening 56 in the outer plate 18, whereby the screw 51 may be actuated to force the brake shoes into frictional contact with the disc H and to release said shoes from such contact. It will be seen that the nut 54 has a circular head 57 provided with a series of threaded openings 58 facilitating the fastening of the wheel 55 at correct points on the nut, whereby to provide for taking up of wear on the brake shoes. A spring detent 59 engages the toothed periphery 60 of the head 57 to prevent unintentional adjustment of the wheel 55 and screw 51.

The wheel 55 has radially extended finger pieces 62 on its periphery to facilitate turning of the wheel, and it is also provided with characters 63 on its periphery to indicate the free spool position of the wheel and other positions required to vary the drag. A stop member 64 on the plate 18 limits the turning of the wheel when a projection 65 on the latter engages said stop. When this projection engages one side of the stop, the screw 51 is in position to release the brake shoes 48, and the disc 8 is therefore free to rotate with the gears thereon describing, a planetary movement as the spool D rotates freely to unwind the line. This is known as the free spooling adjustment of the drag. However, as the wheel is turned in a clockwise direction the screw 51 will operate to force the shoes 48 into frictional engagement with the disc H and the extent of the "drag" effect will depend upon the extent of clockwise turning of the wheel 55. The stop 57 will serve as a pointer for the characters on the periphery of the wheel to indicate the amount of drag or braking action.

With the drag adjusted to free spooling position, the operator may cast the line from the spool or feed out the line while the spool may rotate freely and cause a planetary motion of the gears on the then rotating disc H without transmitting such motion to the handle. When a fish is hooked or prior to the hocking of the fish, the operator may adjust the drag means K by appropriate manipulation of the wheel 55 whereby a light or heavy "drag" is set up by the shoes 48 to resist the unwinding rotation of the spool. This adjustment may be made so as to provide a heavy or light drag, depending upon the size or pulling effort of the fish and upon the manner of handling the catch as practiced by the particular fisherman. When the disc is frictionally held by the shoes to an extent that it will not rotate on its own axis during the rotation of the handle, this being when a heavy drag is set up, the operator may reel in the line upon clockwise rotation of the handle. During this operation the gears 43 and 44 remain stationary except as to rotation on their axes and thereby serve as an ordinary gear drive connection between the handle and the spool. It will be noted that this constitutes a "geared-up" connection whereby the spool will rotate at a greater rate of speed than the handle. It should be noted that the wheel 55 is at all times readily accessible to the operator who may at will release the spool for free rotation upon a mere turn of the wheel or may set up the correct amount of "drag" as desired, in as efficacious a manner.

It is important to note that the reel of this invention may be made more durable, stronger and compact by having the geared connection of the handle and spool disposed within the reel frame as here shown, so as to allow the gears to run in a quantity of liquid lubricant. The particular rotating disc and brake shoes as here employed, provide for a better braking and drag action of the reel under a nicety of control not possible with other types of drags or brakes and particularly in view of the single and simple form of adjusting means for the drag located at a stationary point on the frame rather than on the handle. The enclosing of these elements in the frame eliminates the bulky handle structure which must be provided when the handle is constructed to house these parts.

It will be noted that the drag adjusting wheel having the numbers or characters on the periphery thereof facilitates an accurate setting of the right "drag" for line of a given weight and to suit other conditions at hand. For example if the drag action desired is such that the wheel character 4 will appear opposite the stop member, then the wheel may be adjusted as desired to release the spool and upon being turned to bring said character 4 opposite said pointer will set up the proper resistance to the unwinding of the spool.

We claim:
1. A fishing reel comprising a frame including a stationary gear casing, a spool rotatable on said frame, a handle rotatable on said frame, driving and driven gears fixed for rotation with said handle and spool respectively and located within said casing, a disc rotatably supported in said casing, a planetary gear train carried by said disc and providing a driving connection between said driving and driven gears, drag means adapted to frictionally engage said disc and drag adjusting means mounted on a fixed portion of said frame and regulating the frictional contact of said drag means with said disc, said drag means including friction shoes adapted to engage opposite sides of said disc adjacent the periphery of the latter, said drag adjusting means including a screw associated with said shoes and a nut adjustable on said screw and disposed exteriorally of said casing for manual manipulation.

2. A fishing reel comprising a frame including a gear case, a spool rotatable on said frame, a handle rotatable on said frame, driving and driven gears fixed for rotation with said handle and spool respectively, a disc rotatable in said case, a planetary gear supported by said disc and meshing with said driving gear, another planetary gear on said disc and meshing with said first named planetary gear and said driven gear, a friction shoe slidably mounted on said case for movement into and out of engagement with a side face of the disc, a spring urging said shoe away from said disc, a threaded member connected with said shoe and slidable relative to said case and a nut turned on said threaded member and operable for moving said threaded member and maintaining it in a position regulating the degree of frictional contact of the shoe with said disc.

3. A fishing reel comprising a frame including a gear case, a spool rotatable on said frame, a handle rotatable on said frame, coaxial driving and driven gears fixed to and for rotation with said handle and spool respectively, a disc coaxial with said gears and rotatable in said case, a planetary gear carried by said disc and meshing with said driving gear, another planetary gear carried by said disc and meshing with said driven gear and the first named planetary gear, a friction shoe slidably supported in said case for movement into and out of engagement with a side of the disc, a spring urging said shoe away from said disc, and means for moving said shoe into and maintaining the same in frictional contact with said disc including a threaded member fixed to the shoe and extending outwardly of and movable relative to the case, and a nut rotatable upon and for moving said threaded member to operate said shoe.

OSCAR KOVALOVSKY.
ARTHUR KOVALOVSKY.